United States Patent [19]
Bolin et al.

[11] Patent Number: 5,751,844
[45] Date of Patent: May 12, 1998

[54] METHOD AND APPARATUS FOR IMAGE ACQUISITION WITH ADAPTIVE COMPENSATION FOR IMAGE EXPOSURE VARIATION

[75] Inventors: Mark Robert Bolin, Tucson; Gregory Tad Kishi, Oro Valley; Michael Philip McIntosh, Tucson, all of Ariz.

[73] Assignee: International Business Machines Corporation, Armonk, N.Y.

[21] Appl. No.: 593,538

[22] Filed: Jan. 29, 1996

Related U.S. Application Data

[63] Continuation of Ser. No. 255,299, Jun. 7, 1994, abandoned, which is a continuation of Ser. No. 871,380, Apr. 20, 1992, abandoned.

[51] Int. Cl.$^6$ ........................................ G06K 9/62
[52] U.S. Cl. ..................... 382/156; 382/274; 348/221; 396/49
[58] Field of Search ........................ 382/156, 254, 382/274; 348/221, 229, 362; 354/410, 412, 485; 395/21, 22, 23; 396/49

[56] References Cited

U.S. PATENT DOCUMENTS

| | | | |
|---|---|---|---|
| 4,589,141 | 5/1986 | Christian et al. | 382/14 |
| 4,978,990 | 12/1990 | Yamasaki et al. | 395/22 |
| 4,998,209 | 3/1991 | Vuichard et al. | 348/673 |
| 5,048,095 | 9/1991 | Bhanu et al. | 382/9 |
| 5,053,871 | 10/1991 | Ogawa et al. | 358/228 |
| 5,053,875 | 10/1991 | Ishui et al. | 358/228 |
| 5,075,871 | 12/1991 | Weidman | 395/24 |
| 5,084,754 | 1/1992 | Tomitaka | 358/209 |
| 5,111,301 | 5/1992 | Haruki et al. | 358/228 |
| 5,216,463 | 6/1993 | Morita | 395/22 |
| 5,227,835 | 7/1993 | Anagnstopoulos | 395/22 |

*Primary Examiner*—Leo Boudreau
*Assistant Examiner*—Chris Kelley
*Attorney, Agent, or Firm*—Dan A. Shifrin; Barry J. Bumgardner; Andrew J. Dillon

[57] ABSTRACT

In an image acquisition system, which produces at least one image, each of which is scorable with reference to at least one image quality criterion, a control system is provided for optimizing the image quality criterion. Typically, the image quality criterion is at least in-part established by an exposure parameter. When considered as an apparatus, the present invention includes a number of components which cooperate together to automatically and continually adjust the value of the exposure parameter to optimize the image quality criterion. An image acquisition means is provided to obtain one or more acquired images under selected exposure characteristics. A transform system is provided for receiving the one or more acquired images and developing an energy distribution map, or histogram, of at least a portion of the one or more acquired images. A neural network means is provided for maintaining a learned relationship between the image quality criterion and the exposure parameter, and for receiving the energy distribution map of the one or more acquired images, and for automatically providing a corrected exposure parameter, so that subsequent acquired images will be obtained under optimal settings of the exposure parameter. A controller member is provided for supplying corrected exposure parameters, which are the output of the neural network means, to the image acquisition means.

19 Claims, 15 Drawing Sheets

(1) $Net_i = \sum_{j=1}^{n} input_j \times Weight_j$ (2) $Output_i = \dfrac{1}{1 + e^{-net_i}}$

METHOD AND APPARATUS FOR IMAGE ACQUISITION WITH ADAPTIVE COMPENSATION FOR IMAGE EXPOSURE VARIATION

This is a continuation of application Ser. No. 08/255,299, filed 7 Jun. 1994 now abandoned, which is a continuation of application Ser. No. 07/871,380, filed 20 Apr. 1992 now abandoned.

BACKGROUND OF THE INVENTION

1. Technical Field

The present invention relates in general to image acquisition systems, and in particular to compensation systems for image exposure control parameters in camera systems. Still more particularly, the preferred embodiment relates to a method and apparatus for utilizing a neural network to provide adaptive compensation for illumination variation in a computer-based vision system to overcome the problems associated with the fluctuation in illumination intensity from commercial light sources which are used to illuminate the objects which are manipulated, at least partially, in response to data obtained by the vision system.

2. Description of the Related Art

Vision systems are computer-based systems which receive video signals and make decisions or manipulate objects based at least in-part upon information contained in the video signal. While vision systems have a wide range of potential applications, one common actual application is in data processing systems in which mass memory storage devices, such as magnetic tape cartridges, are identified and manipulated. Typically, bar coded labels are applied to the mass storage devices to distinguish particular mass storage devices from one another. Vision systems employ video cameras to selectively obtain video images of those bar coded labels. The video images are digitized and supplied to a computer to provide an identification of the particular mass storage devices which are revealed in the particular video image, with the digital signals being representative of the particular bar code on each of the mass storage devices in that video image. Based upon this stream of identifying data, a computer can perform one or more search operations. When the desired mass storage devices are found, the computer can initiate and control the operation of a robotic arm to physically manipulate the mass storage devices, usually to load the mass storage devices for reading or writing operations, or to return a mass storage device to a selected location on a carrel for storage.

One problem which is common to all vision systems is that it is impossible to maintain a constant amplitude illumination on the objects which are intended for viewing by the vision system. This is true because incandescent lighting sources (typically tungsten-halogen lamps) will drift in intensity during operation. Fluctuation in light intensity can result in miscalibration of camera exposure variables, and can cause undesirable read errors. Fluctuation in light intensity can be compensated for in commercially available video image processors by selective adjustment of a "gain" and an "offset" control signal (which will be described herebelow in considerable detail) in an analog signal conditioner.

Gain and offset are just two examples of image acquisition exposure variables which are dependent upon the light intensity, or which have an impact on the photographic exposure of the images. Other video and photographic camera image acquisition exposure variables include: camera f-stop; shutter speed; illuminator level; and camera amplifier gain.

SUMMARY OF THE INVENTION

It is one objective of the present invention to provide a method and apparatus for automatically compensating an image acquisition system to take into account undesirable fluctuation in an exposure parameter which would otherwise possibly adversely affect image quality.

It is another objective of the present invention to provide a method and apparatus for automatic adjustment of an exposure parameter in a video image acquisition system.

It is yet another objective to provide a method and apparatus of automatic adjustment in the offset and gain control signals in a computer-based video image acquisition system to automatically compensate for fluctuation in intensity of an illumination device.

These and other objectives are achieved as is now described. In an image acquisition system, which produces at least one image, each of which is scorable with reference to at least one image quality criterion, a control system is provided for optimizing the image quality criterion. Typically, the image quality criterion is at least in-part established by an exposure parameter. When considered as an apparatus, the present invention includes a number of components which cooperate together to automatically and continually adjust the value of the exposure parameter to optimize the image quality criterion. An image acquisition means is provided to obtain one or more acquired images under selected exposure characteristics. A transform system is provided for receiving the one or more acquired images and developing an energy distribution map, or histogram, of at least a portion of the one or more acquired images. A neural network means is provided for maintaining a learned relationship between the image quality criterion and the exposure parameter, and for receiving the energy distribution map of the one or more acquired images, and for automatically providing a corrected exposure parameter, so that subsequent acquired images will be obtained under optimal settings of the exposure parameter. A controller member is provided for supplying the corrected exposure parameters, which are the output of the neural network means, to the image acquisition means, to allow it to use the corrected exposure parameter in obtaining at least one subsequent image with an improved image quality criterion.

BRIEF DESCRIPTION OF THE DRAWING

The novel features believed characteristic of the invention are set forth in the appended claims. The invention itself however, as well as a preferred mode of use, further objectives and advantages thereof, will best be understood by reference to the following detailed description of a preferred and illustrative embodiment when read in conjunction with the accompanying drawings, wherein:

DETAILED DESCRIPTION OF PREFERRED EMBODIMENT

Figure 1:
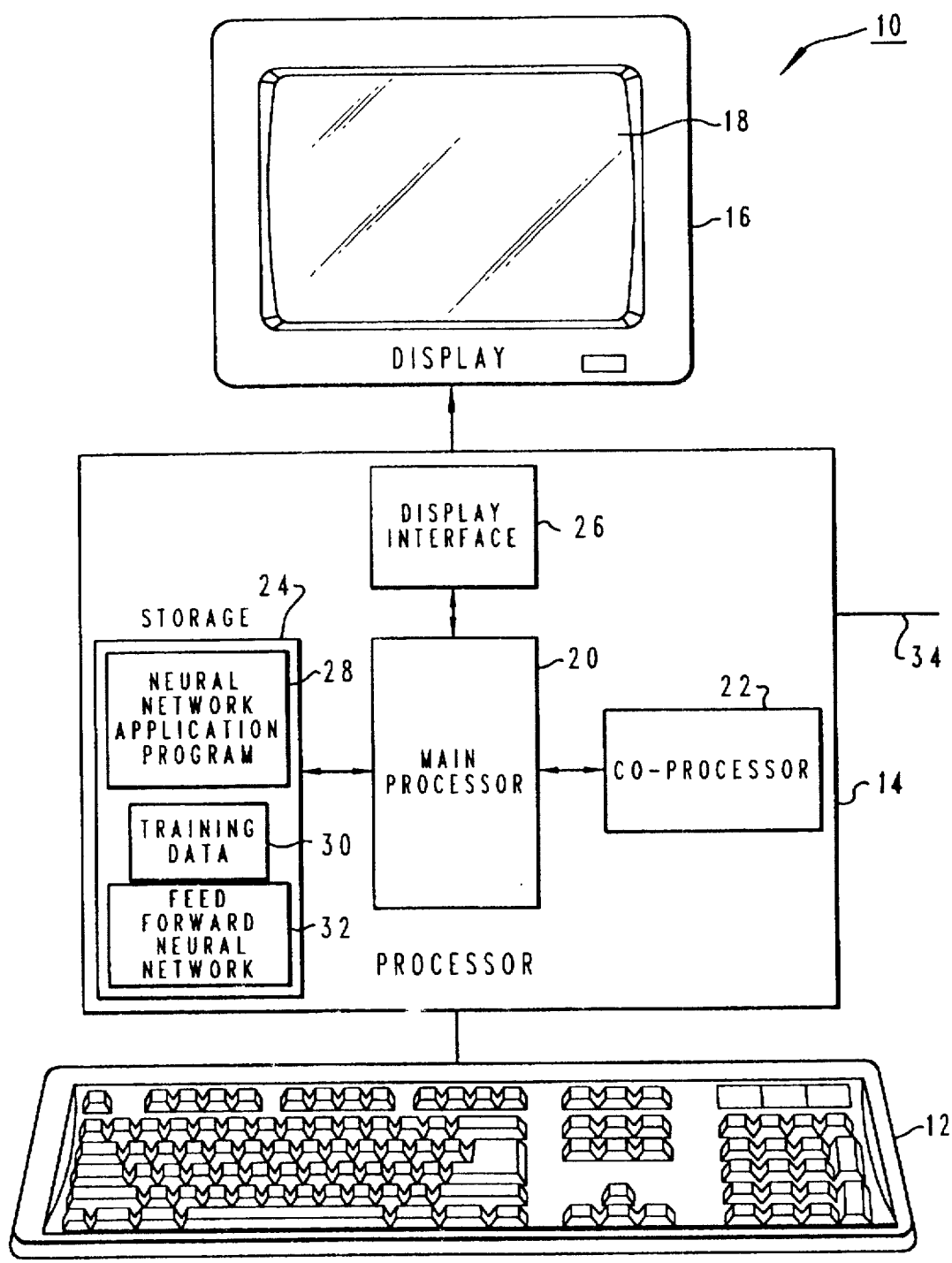
FIG. 1 illustrates a computer system.

With reference now to the figures and in particular with reference to FIG. 1, there is depicted a block diagram of computer system 10 which may be utilized to implement the method and apparatus of the present invention. As those skilled in the art will appreciate, computer 10 may be implemented utilizing a well-known personal computer, such as the International Business Machines Corporation PS/2 computer, or any other suitable computer. Computer system 10 preferably includes keyboard 12, processor 14, and display 16 which includes screen 18.

Still referring to FIG. 1, within processor 14 of computer system 10, there is depicted a main or central processing unit 20, which is connected to storage means 24. Storage means 24 may be a primary memory device, such as a random access memory (RAM) and/or a secondary memory device, such as a magnetic or optical storage unit. Main processor 20 is also preferably connected to co-processor 22. Co-processor 22 may provide generic math calculation functions in the manner of a well known math co-processor or may be a specialized neural network hardware support function processor (a neural network processor). Those having skill in the art will appreciate that co-processor 22 may not be necessary to implement the method and system of the present invention if main processor 20 includes sufficient process power to handle intensive computational workload without unacceptable performance degradation.

Main processor 20 is also preferably connected to display interface 26, which is utilized to control display 16 in a manner well known to those having skill in the art. In the preferred embodiment of the present invention, neural network application program 28, training data 30, and feed forward neural network 32 are maintained in storage means 24. Communication link 34 is provided to allow processor 14 to control end devices, as will be discussed herebelow.

Figure 2:
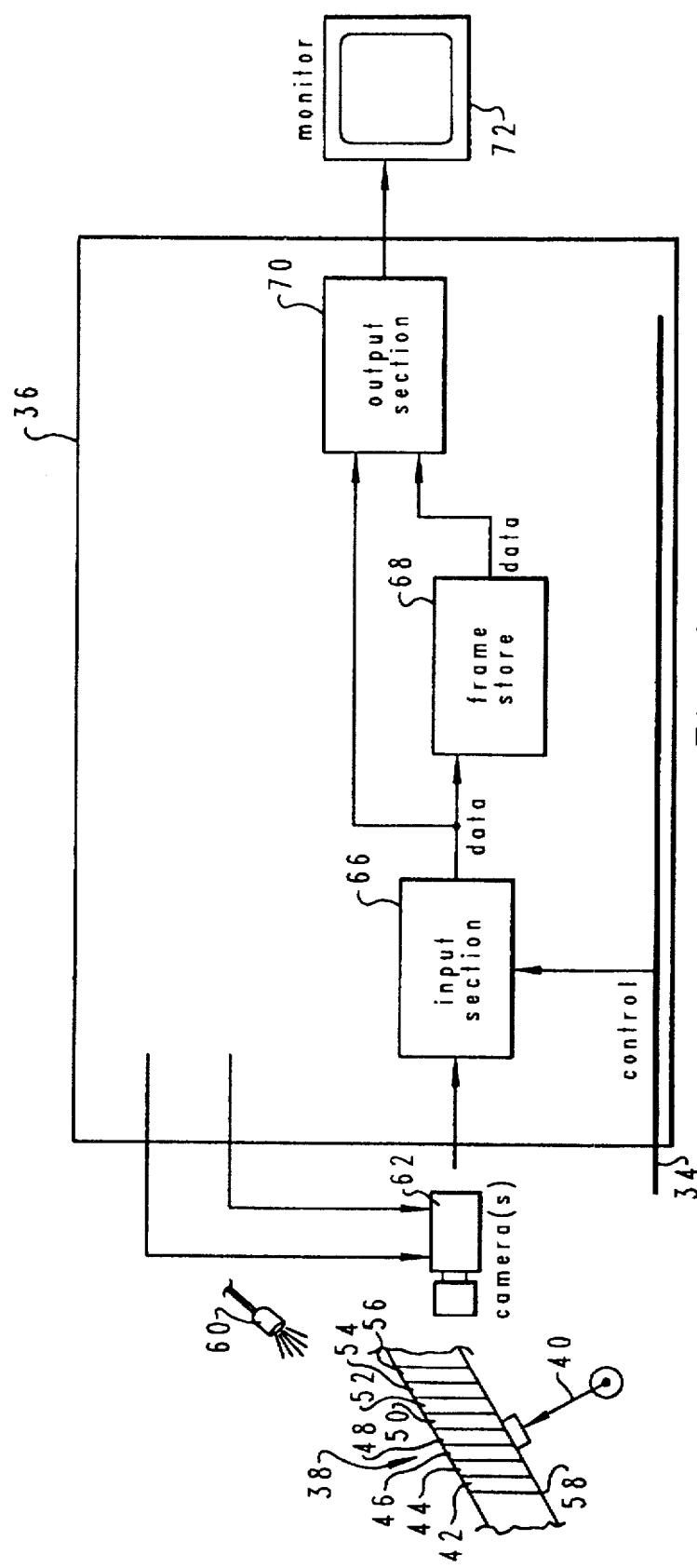
FIG. 2 depicts one type of commercially available vision system, in a high level block diagram, which receives control signals from the computer system of FIG. 1.

Referring now to FIG. 2, there is depicted one type of commercially-available vision system 36, in a high level block diagram format, which receives control signals from computer system 10 of FIG. 1. Vision system 36 is potentially useful in allowing computer moderated manipulation of objects 38 through use of computer-actuated robotic arm 40. In the preferred embodiment of the present invention, robotic arm 40 may comprise a computer-operable robotic device which is manufactured by GMFanuc Robotics Corporation, of Auburn Hills, Mich., and identified as Model No. S-10. One common and current commercial use of vision system 36 is in the selective manipulation of an array of mass memory storage devices, such as magnetic tape cartridges 42, 44, 46, 48, 50, 52, 54, 56, which are disposed in selected locations on magnetic tape storage array 58. Typically, an identifying label is affixed to each magnetic tape cartridge. Each label usually carries both a human-readable identification, as well as a machine-readable identification which is typically in the form of a "bar code". Light source 60, which is preferably a tungsten-halogen lamp source, is provided to illuminate the machine-readable bar code identification labels (not shown in FIG. 2) on magnetic tape cartridges 42, 44, 46, 48, 50, 52, 54, and 56.

Still referring to FIG. 2, vision system 36 generally includes one or more video cameras 62 which selectively obtain images of objects 38 which are to be manipulated by computer-actuated robotic arm 40. Camera 62 operates to selectively acquire one or more video images of objects 38. Preferably, camera 62 generates an analog video signal which is directed to input section 66 which receives control signals from main processor 20 via communication link 34. Input section 66 produces a digital pixel stream as an output which may be temporarily stored for selective retrieval by frame store 68 or routed to monitor 72 via output section 70 for viewing. The digital pixel stream may be simultaneously stored in memory in frame store 68 and viewed at monitor 72. Output section 70 takes the digital pixel stream and produces analog video signals which are provided as an input signals to monitor 72. Preferably, the digital pixel stream can come directly from input section 66, or from frame store 68, or a combination thereof.

Viewed broadly, vision system 36 operates as an image acquisition system. The images acquired by camera 62 may be of either poor or high quality depending upon the particular values of exposure parameters. In a video camera based image acquisition system, the "exposure parameters" include "gain" and "offset" values which are provided as control signals to input section 66 by processor 14. In a photographic based image acquisition system, the "exposure parameters" may include lens iris setting (also known as camera F-stop), shutter speed, illumination level, and camera amplifier gain. The preferred embodiment of the present invention which is described herein is a video-based image acquisition system which employs a Cognex brand Model No. 2000 machine vision system, which is manufactured and offered for sale by Cognex Corporation of Needham, Mass., which has a business and correspondence address at 15 Crawford Street, Needham, Mass. 02194. Also, in the preferred embodiment of the present invention camera 62, which cooperates in the image acquisition process, is preferably a Pulnix brand Model No. TM-7EX video camera, which is manufactured by Pulnix America, Incorporated of Sunnyvale, Calif., which has a business and correspondence address at 770 Lucerne Drive, Sunnyvale, Calif. 94086.

In the preferred embodiment of the present invention, feed forward neural network 32 may be stored in the memory of, and executed by, a processor which is integral with the Cognex machine vision system, so a personal computer, as shown in FIG. 1, need not be dedicated to the control of vision system 36. In that event, training data 30 is supplied to neural network application program 28 in a personal computer to develop the weights for feed forward neural network 32. The weights are then downloaded to neural network 32, which is contained in the dedicated processor of vision system 36.

Figure 3:
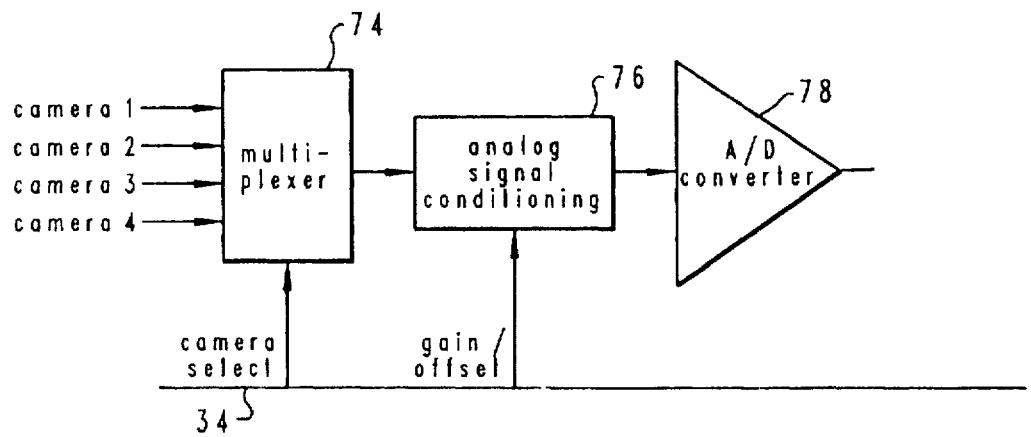
FIG. 3 illustrates the components of the input section of the commercially available vision system of FIG. 2, in block diagram form.

With reference now to FIG. 3, there is depicted the components of input section 66 of vision system 36 of FIG. 2, in block diagram form. Multiplexer 74 is provided to allow computer system 10 to selectively control the acquisition of video images from a plurality of cameras. The analog output signal from the selected camera is provided to analog signal conditioning block 76. Analog signal conditioning block 76 is adapted to receive gain and offset exposure control parameter values from computer system 10 via Communication link 34. The output of analog signal conditioning block 76 is provided to analog-to-digital converter 78 which receives the analog data stream and produces a digital pixel stream.

Figure 4:
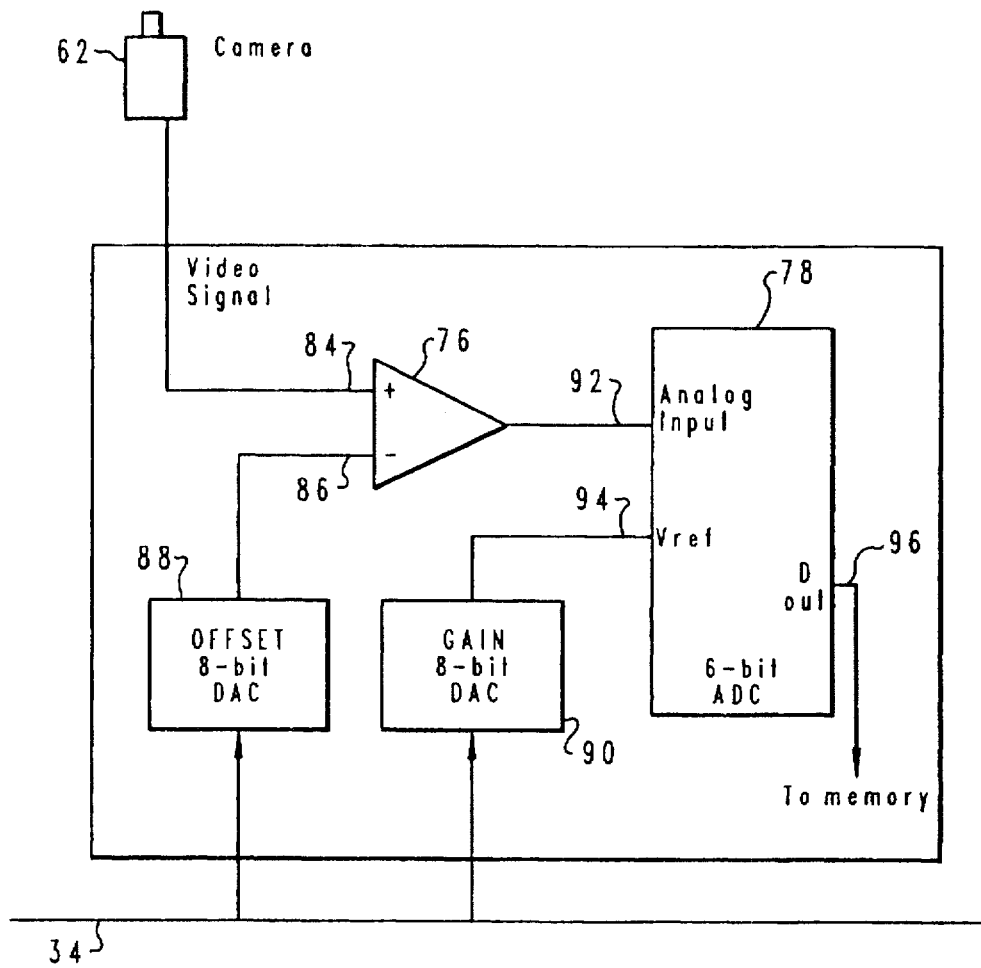
FIG. 4 depicts in greater detail the analog signal conditioning and analog-to-digital function blocks of the input section of FIG. 2.

Referring now to FIG. 4, there is depicted in greater detail the analog signal conditioning and analog-to-digital functional blocks of input section 66 of FIG. 2; this figure is especially useful in understanding the impact of the gain and offset exposure control parameter values on the analog and digital pixel data stream which is produced by camera 62. As is shown, an analog output signal is provided from video camera 62 to the non-inverting input 84 of operational amplifier 76. Computer system 10 provides an eight-bit offset control signal via Communication link 34 to offset digital-to-analog converter 88, which provides its analog output to the inverting input of the operational amplifier of analog signal conditioning block 76. The output of the operational amplifier of analog signal conditioning block 76 is provided to analog input 92 of analog-to-digital converter 78. An eight-bit gain control signal is supplied by computer system 10 via Communication link 34 to eight-bit digital-to-analog converter 90, which provides its analog output to the Vref input 94 of analog-to-digital converter 78. Analog-to-digital converter 78 provides its digital output 96 to the other functional blocks of vision system 36 of FIG. 2. The operational amplifier of analog signal conditioning block 76 operates to subtract the voltage value provided by digital-to-analog converter 88 from the voltage value of the video signal provided by camera 62 to the non-inverting input of the operational amplifier. Therefore, the operational amplifier performs a subtraction function. Analog-to-digital converter 78 receives the analog output from the comparator, as well as the analog output from digital-to-analog converter 90 which determines the "gain" of analog-to-digital converter 78, and thus determines the total potential span of the digital output 76. Each pixel in the video image is provided with a digital grayscale value between grayscale zero and grayscale sixty-three. The concepts of the offset and gain exposure control parameters can best be understood with reference to FIGS. 5, 6, 7, 8a, 8b, and 8c.

Figure 5:
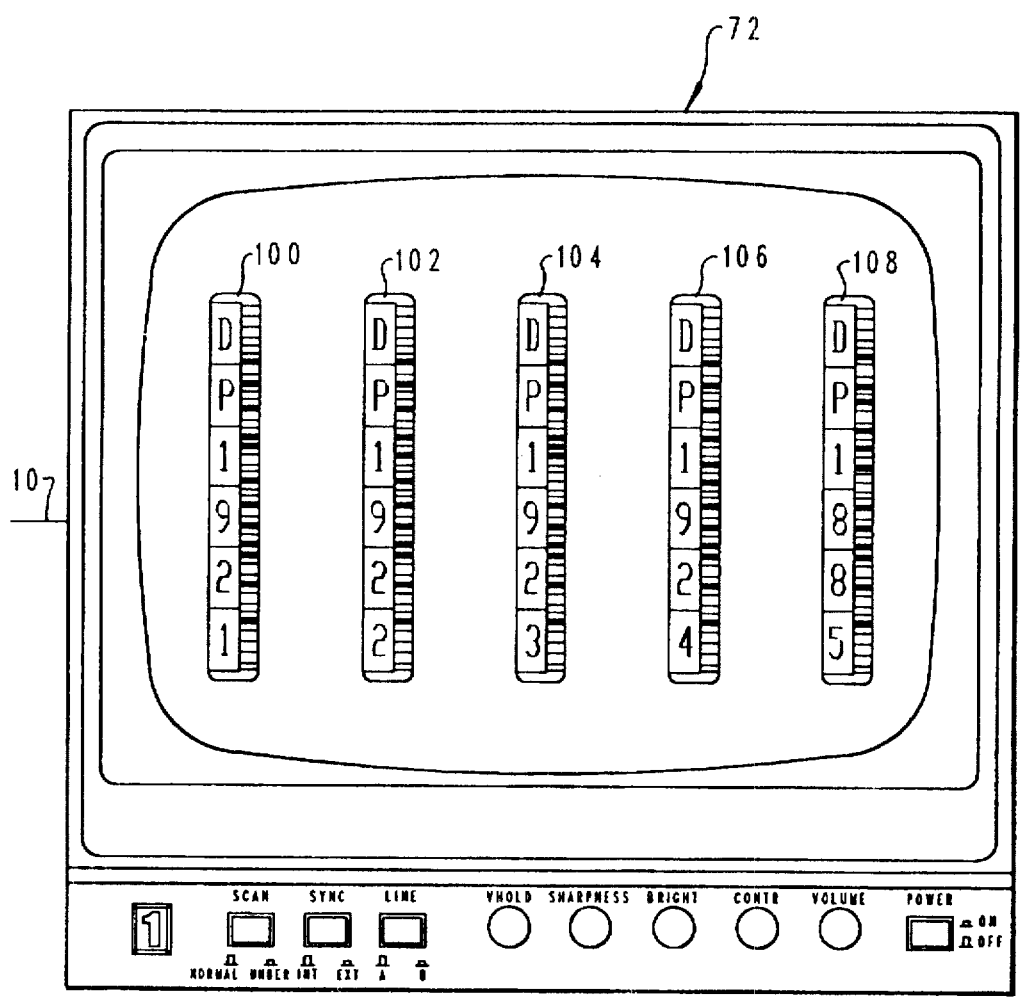
FIG. 5 illustrates an example of the types of images obtained with the video camera of FIG. 2, as displayed on the monitor of FIG. 2.

Referring now to FIG. 5, there is depicted an example of the types of images obtained with camera 62 of FIG. 2, as displayed on monitor 72 of FIG. 2. As shown in FIG. 5, five magnetic tape cartridge identification labels are contained in the acquired image, and are displayed on the screen of monitor 72, and include: identification labels 100, 102, 104, 106, and 108. Each of these identification labels 100, 102, 104, 106, 108 include a human-readable portion and a machine-readable portion. In the depiction of FIG. 5, the machine-readable portion is a bar-coded portion which corresponds to the alphanumeric characters in the adjoining human-readable portion of the label. For purposes of discussion, assume that horizontal scan line produces an analog voltage signal which is depicted during one illumination amplitude condition in FIG. 6, and another, higher, illumination amplitude condition in FIG. 7. In the graphs of FIGS. 6, 7, 8a, 8b, and 8c, the X-axis is representative of horizontal location, and the Y-axis is representative of voltage amplitude from the analog signal associated with horizontal scan line 110 of the image displayed on monitor 72 of FIG. 5.

Figure 6:
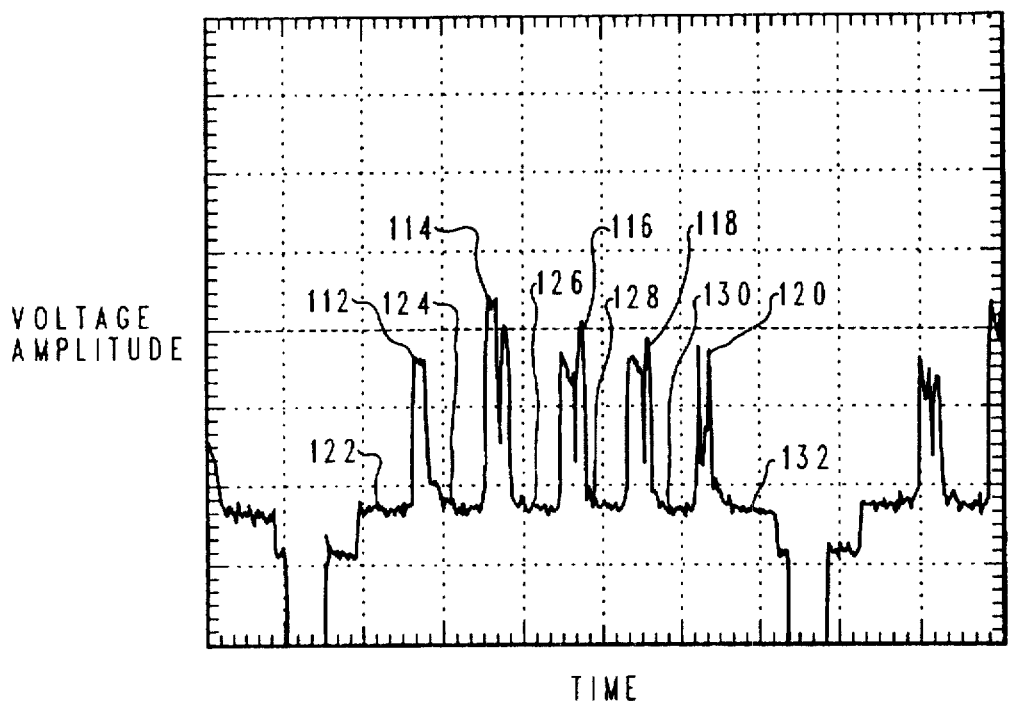
FIG. 6 depicts an example of the analog video signal obtained by the video camera of FIG. 2 from a single horizontal scan line of the image of FIG. 5.

Referring now to FIG. 6, voltage peaks 112, 114, 116, 118, and 120 correspond to horizontally aligned light (or white) regions of the acquired image which is displayed on monitor 72 of FIG. 5. Voltage portions 122, 124, 126, 128, 130, 132 which are interspersed with voltage peaks 112, 114, 116, 118, 120 correspond to darker portions of the magnetic tape cartridge identification labels 100, 102, 104, 106, 108, and the regions between the labels.

Figure 7:
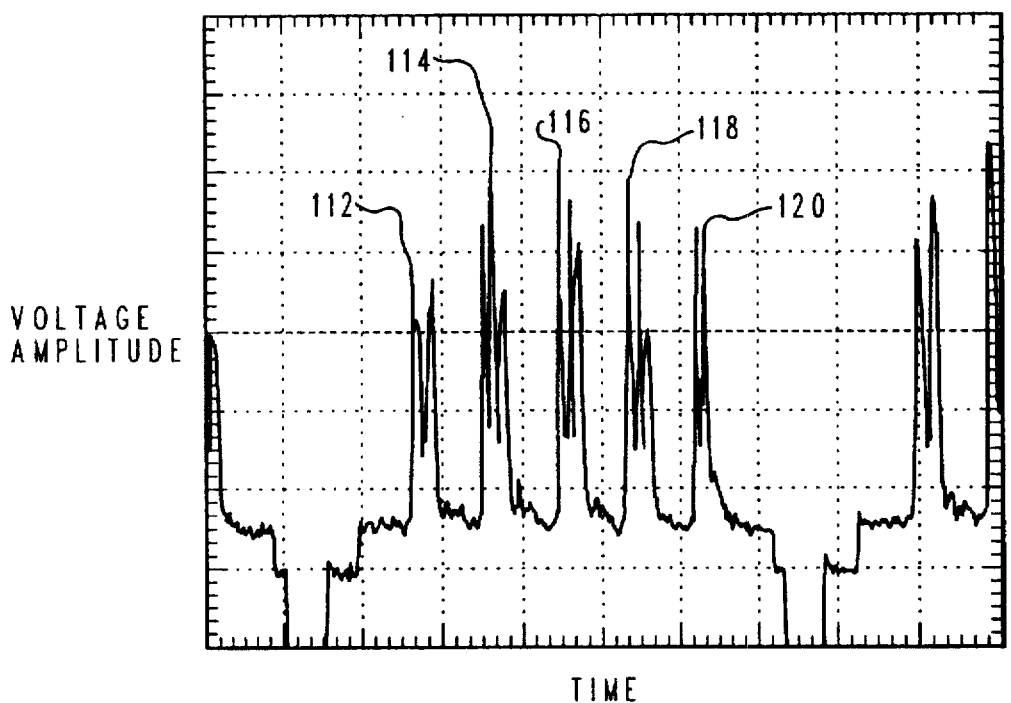
FIG. 7 illustrates another example of the analog video signal obtained by the video camera of FIG. 2 from a single horizontal scan line of the image of FIG. 5, under different lighting conditions, with FIGS. 6 and 7 together illustrating the great impact changes in illumination intensity have on the analog signals produced by the video camera.

Referring now to FIG. 7, there is depicted an analog video data stream, of the same objects which produced the video data stream which is graphically depicted in FIG. 6, but under a more intense illumination source. Note that voltage peaks 112, 114, 116, 118, and 120 have significantly increased amplitudes as compared to the amplitudes of the same voltage peaks in FIG. 6, due solely to the difference in illumination intensity.

Figure 8A:
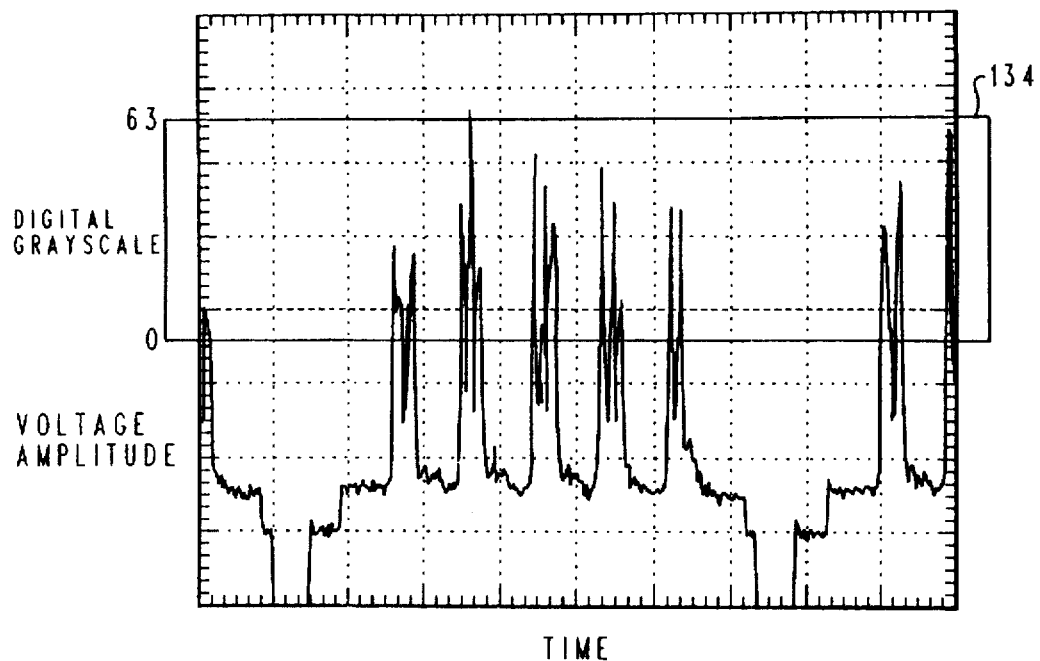
FIGS. 8a and 8b graphically depict the detrimental effect that incorrect gain and offset settings can have on the production of digital grayscale values for the single horizontal scan line of FIG. 7, while FIG. 8c graphically depicts the beneficial effect that correct gain and offset settings can have on the production of digital grayscale values for the single horizontal scan line of FIG. 7.
Figure 8B:
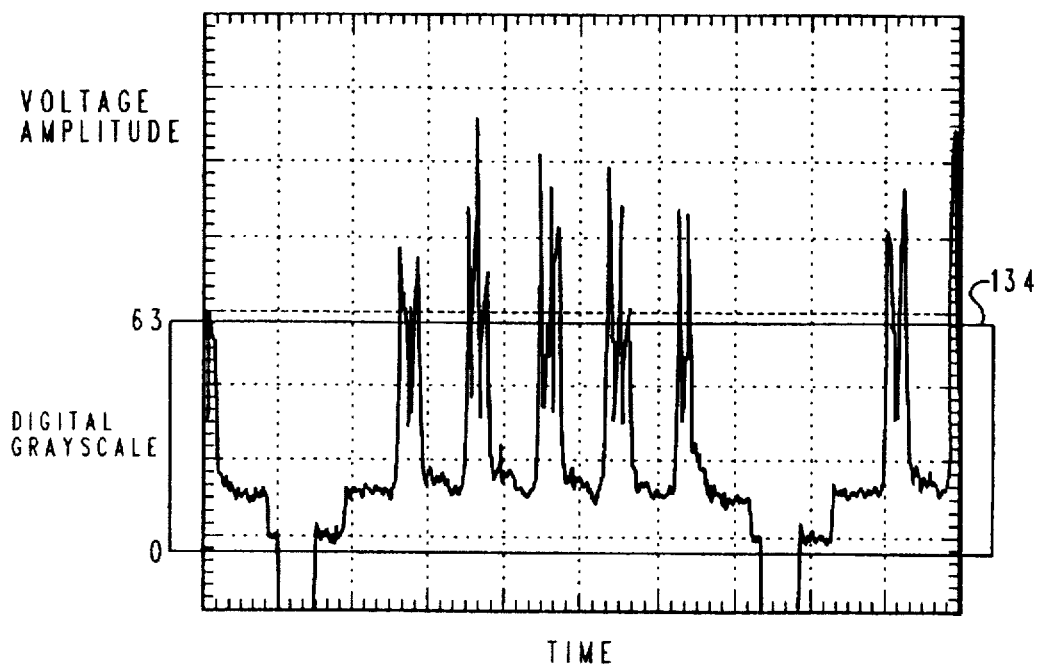
Figure 8C:
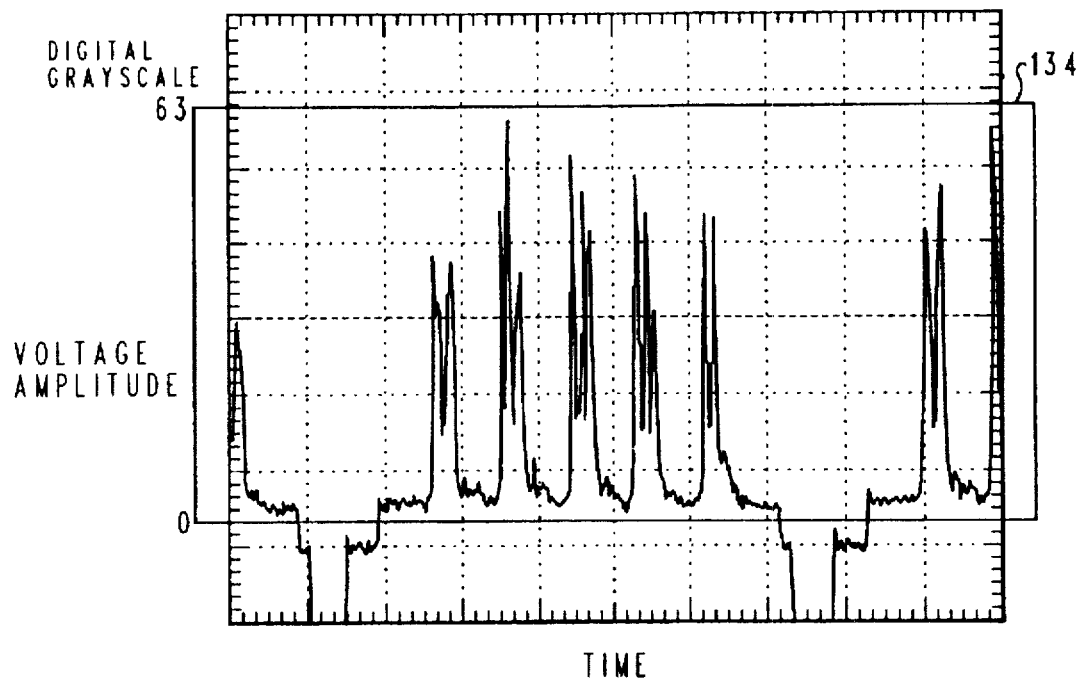

FIGS. 8a, 8b, and 8c will now be used to describe the importance of the offset and gain exposure parameters. These figures all provide an analog video data stream which is identical to that of FIG. 7; however, a graphic overlay is provided upon each of these graphic representations of the analog video data stream to graphically depict the impact of the offset and gain exposure control parameters. FIGS. 8a and 8b graphically depict the detrimental affect that incorrect gain and offset settings can have on the production of video grayscale values for the single horizontal line scan of FIG. 7, while FIG. 8c graphically depicts the beneficial affect that correct gain and offset settings can have on the production of digital grayscale values for the single horizontal scan line of FIG. 7.

Turning first to FIG. 8a, the X-axis of overlay 134 is representative of horizontal position, while the Y-axis of overlay 134 is representative of the voltage amplitude of the analog video signal. The vertical scan of overlay 134 extended from grayscale zero from grayscale sixty-three, and is determined by the "gain" exposure control parameter, while the vertical position of overlay 134 relative to the zero value of the Y-axis is representative of the offset exposure control parameter. FIGS. 8a and 8b graphically depict differing offset settings but identical gain settings. Note that the vertical span of overlay 134 is altogether inadequate in capturing the amplitude variance of the analog video signal. Furthermore, note that in FIG. 8a, overlay 134 is disposed at a high position relative to the zero value of the Y-axis. Accordingly, many analog voltage values which are not representative of black (which is the equivalent of a grayscale value of zero) will be automatically set to grayscale zero. When the offset is lowered, as is depicted in FIG. 8b, overlay 134 is provided in a position closer to the zero value of the Y-axis. In this configuration, voltage amplitudes which extend beyond the upper boundary of overlay 134 are digitized to the maximum grayscale value available, which is grayscale value sixty-three. Of course, this causes clipping of significant portions of the analog video data stream, and results in a loss of information.

FIG. 8c depicts the beneficial effect that correct gain and offset settings can have on the production of digital grayscale values for the single horizontal scan line of FIG. 7. The gain setting of FIG. 8c (a gain of one hundred, as opposed to a gain of forty of FIGS. 8a and 8b) is sufficient to allow the entire span of voltage amplitudes to be maintained within overlay 134. Furthermore, overlay 134 is positioned relative to the Y-axis according to an offset value which ensures that neither the upper nor lower portions of the span of analog video voltage signal values are excluded from the digital grayscale range.

With reference again to FIG. 2, fluxuation in magnitude of an exposure parameter, such as illumination intensity of light source 60, can be accommodated for by intelligent selection of exposure control parameter values, such as the intelligent selection of offset and gain exposure values in vision system 36. The present invention provides a method and apparatus for image acquisition which includes an adaptive compensation for image exposure variation, which obtains results which have not been obtained by prior art compensation techniques. In most image acquisition systems, and especially in computer-based vision systems, it is important that an adjustment to the exposure parameter value be made: (1) intelligently; (2) automatically; (3) in a timely manner; and (4) without requiring that sample or test images be acquired. The adaptive compensation system for image exposure variation of the present invention achieves all of these objectives. The present invention provides a technique for making an intelligent correction in a plurality of exposure variables, and in particular in the offset and gain exposure variables, from a single, previous, acquired image, and does not require that any test, sample, or calibration images be acquired during normal operation. In the present invention, every acquired image provides a feed-forward automatic compensation of offset and gain exposure parameter values. Therefore, each current acquired image provides a foundation for adjustment to the offset and gain exposure parameter values, thus establishing the offset and exposure parameter values for the next acquired image. Optimal values of gain and offset ensure that the next acquired image can be defined by an image grid of pixels which range in brightness across the grayscale from a minimum of zero to a maximum of sixty-three (with zero corresponding to a black image, and sixty-three corresponding to a white image).

It is the distribution, or "histogram", of grayscale values for all the pixels which comprise an acquired image which determines whether the image is of poor or excellent quality. Therefore, in the present invention, the gain and offset exposure compensation parameters are established with reference to the distribution of grayscale values for the acquired image. In formulating the solution of the present invention, it was determined that it was especially important that grayscale values at both the upper and lower portions of the grayscale (that is those portions close to grayscale values of zero and sixty-three respectively) be especially highly regarded in evaluating an acquired image and determining what adjustment should be made to the offset and gain exposure control parameters in order to improve the next image. This ensures as wide a distribution of grayscale values as possible, and especially ensures that information contained at the upper and lower portions of the grayscale not be truncated or clipped (as was depicted in FIGS. 8a and 8b). This was found to be an especially good approach, since middle portions of the pixel grayscale are less likely to be affected by incorrect settings of the offset and gain exposure parameter values (this concept is also graphically depicted in the views of FIGS. 8a and 8b).

The present invention provides a bias which "protects" the portions of a grayscale histogram which could in other systems be adversely affected by improper offset and gain exposure control parameter values, thus ensuring maximum resolution of the picture (that is "sharpness") as well as giving the best gain without saturating the picture (that is, without inducing a truncation or clipping of information carried by the analog signal). In order to obtain high quality acquired images, it was necessary to generate a function which attaches a numeric value to an acquired image which is representative of the "goodness" of the acquired image. This value is identified as the acquired image "score". In accordance with the objectives which are stated above, a score function was developed which serves to give a higher "goodness" value for pictures which are spread across the grayscale.

Figure 9:
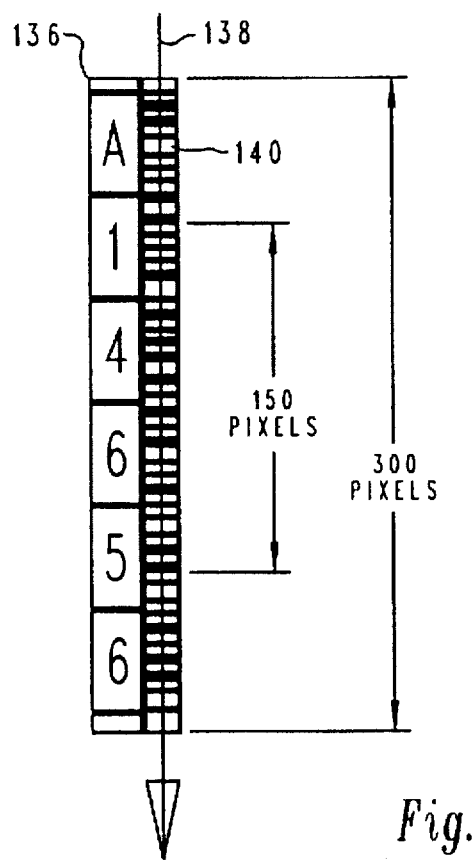
FIG. 9 illustrates a bar coded label which represents three hundred video image pixels of data.

With reference now to FIG. 9, there is depicted a bar coded label 136, which represents three hundred video image pixels of data along vertical scan line 138 which is superimposed over the machine-readable portion 140 of label 136. The analog voltage signal stream which is generated by vertical scan line 138 is supplied to input section 66 of FIG. 2, is conditioned by analog signal conditioning block 76 of FIG. 3, and converted into a digital pixel data stream which is representative of grayscale grading of each of the three hundred pixels in vertical scan line 138.

Figure 10:
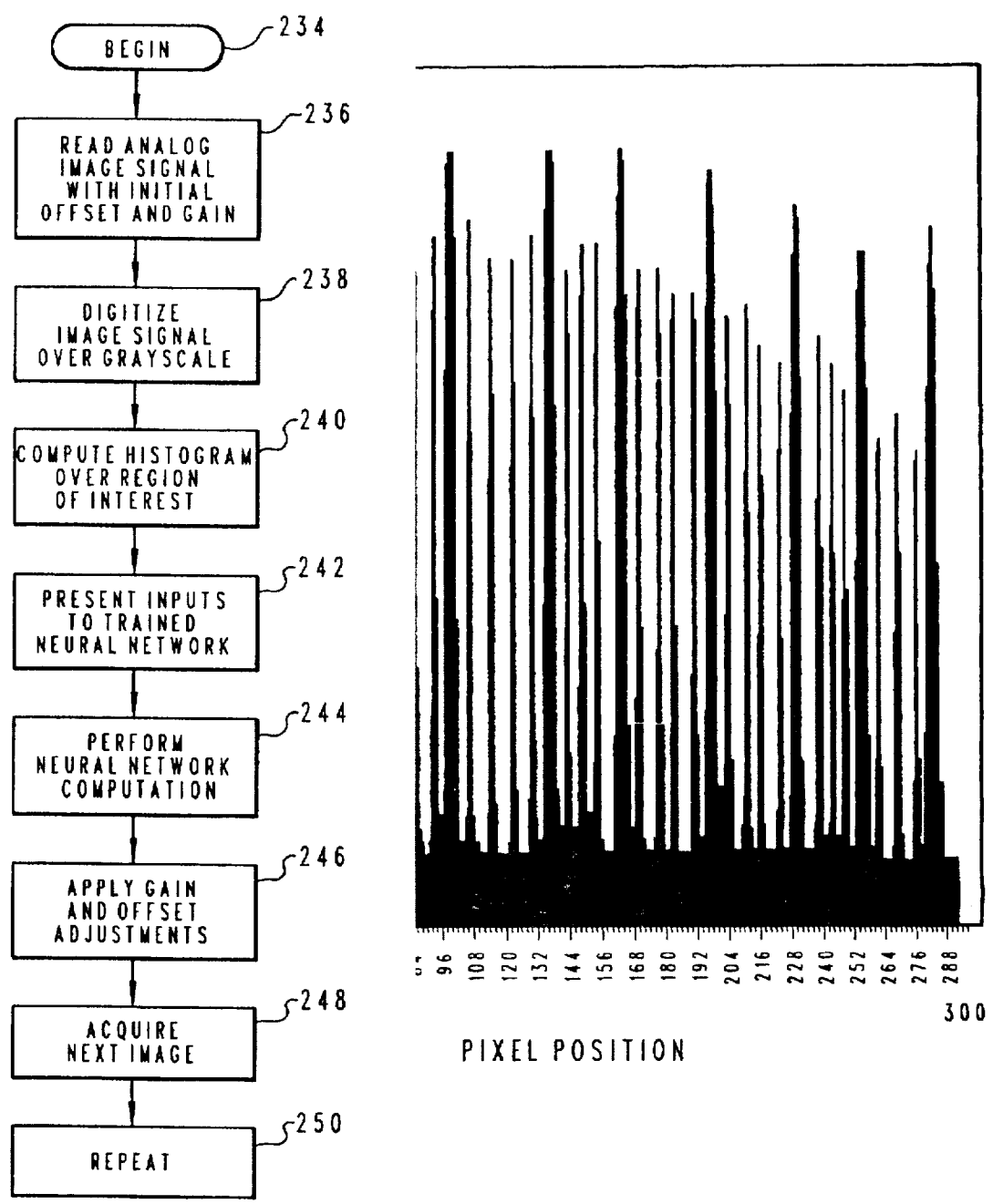
FIG. 10 depicts a graph of grayscale value versus pixel position for the bar coded label which is shown in FIG. 9.

FIG. 10 provides a graphic depiction of pixel grayscale value versus position for vertical scan line 138 of FIG. 9. In this graph, the X-axis is representative of pixel position, and extends from pixel number one through pixel number three hundred, while the Y-axis is representative of the grayscale value of each particular pixel along vertical scan line 138 of FIG. 9. Apparently, the gain and offset exposure compensation parameter values were very near optimal values because the pixel values seem to be well distributed between the grayscale values of zero and sixty-three. Of course, it is difficult to determine qualitatively the degree of distribution of digital grayscale values from a graph of pixel position versus digital grayscale value. In the present invention, instead, a "histogram" is employed to provide a graphical representation of the distribution of grayscale values.

Figure 11:
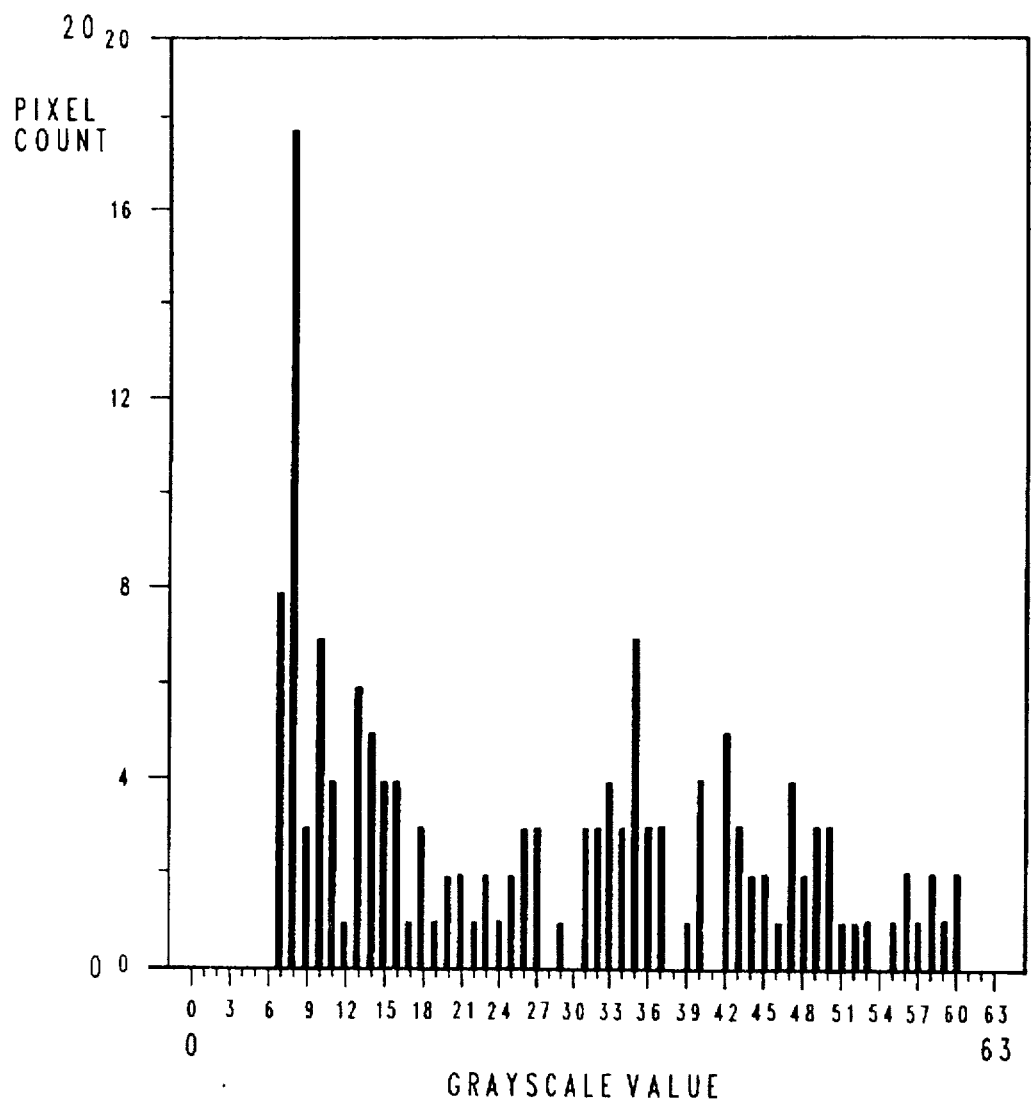
FIG. 11 illustrates a histogram graph of the grayscale value versus pixel count for a center portion of the bar coded label which is shown in FIG. 9.

With reference now to FIG. 11, there is provided a histogram, with the X-axis representative of grayscale value, and the Y-axis representative of the total number of video image pixels which have a grayscale value equivalent to the value established by the X-axis. FIG. 11 provides the histogram for the one hundred and fifty pixel center portion of the vertical scan line 138 of FIG. 9, so this region can be characterized as a "region of interest" or "ROI". For example, the histogram of FIG. 11 reveals that there are approximately twenty pixels in vertical scan line 138 which have a grayscale value of seven, thus constituting the single largest group of pixels having the same grayscale value attribute of the one hundred and fifty total pixels contained in the region of interest of vertical scan line 138. In the present invention, a region of interest may comprise one or more vertical or horizontal scan lines, or portions of a single vertical or horizontal scan line, so the examples of FIGS. 9, 10, and 11 are not intended to be limiting. The concepts of the present invention which are equally applicable to lesser or greater regions of interest in an acquired image. Also, the concepts of the present invention are not limited to "moving picture" type video images, and are equally applicable to "stop action" type photographic or video image processing.

Figure 12:
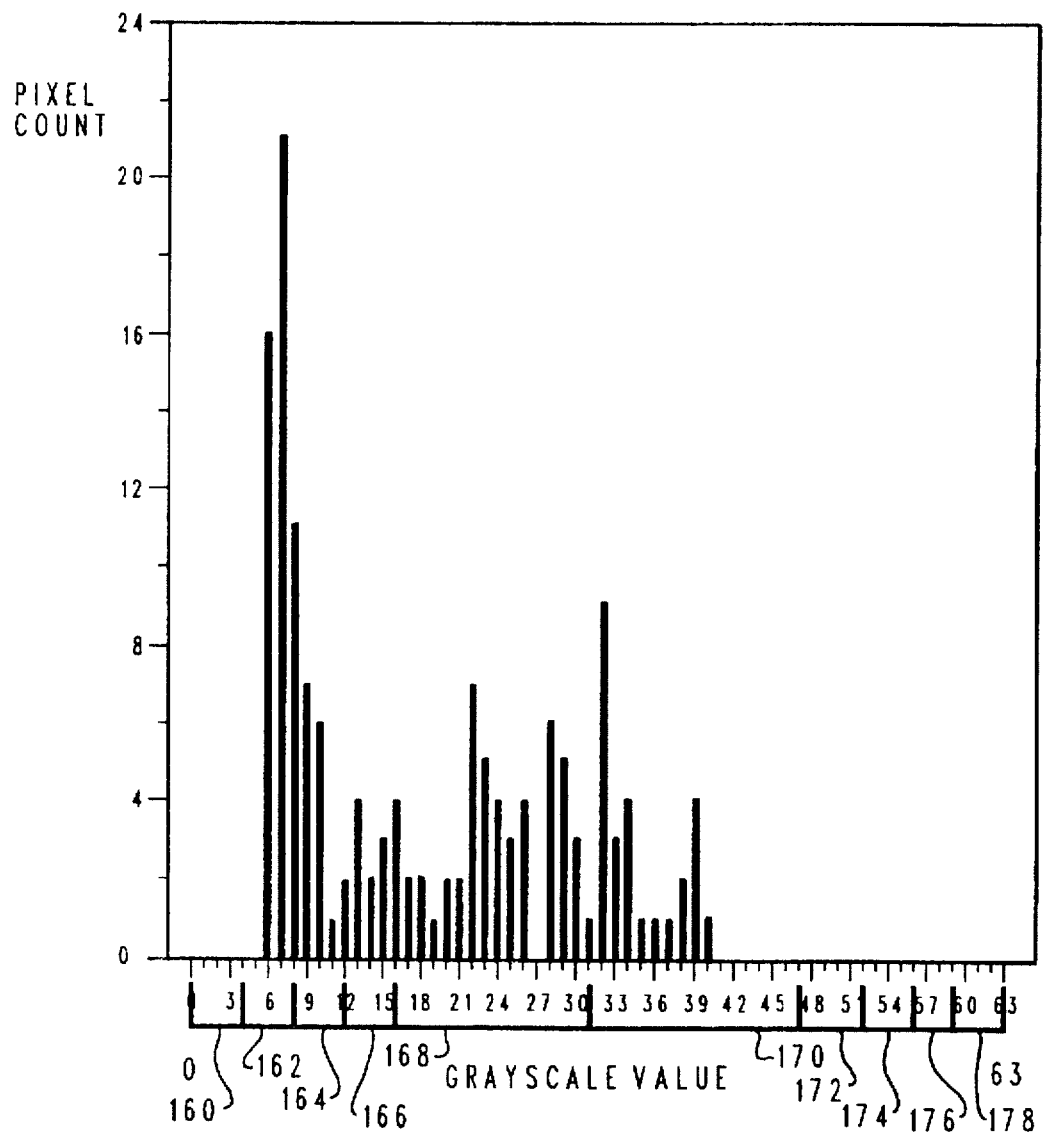
FIG. 12 depicts yet another histogram graph of the grayscale value versus pixel position for a region of interest of a bar coded label, with gain and offset values which are incorrect.

With reference now to FIG. 12, there is depicted another histogram of grayscale value versus pixel count for a region of interest, with offset and gain exposure parameter values which are providing a histogram distribution which is less than optimal. The objective of the present invention is to take the data provided by such a histogram, and to accurately correct the gain and offset exposure parameter values to give optimal performance, which would yield a more even distribution of grayscale values. In the preferred embodiment of the present invention, a neural network is realized in software, and serves to implement a mapping that translates a region of interest grayscale histogram for the current acquired image into corrections to the gain and offset parameter values which are applied in acquiring the next image. Alternately, the feed forward neural network 32 may be used to translate histogram data from one region of interest of an acquired image into corrections to the gain and offset parameter values which are used in acquiring an image of another region of interest in the same image. In yet another alternative, the feed forward neural network 32 may be used to translate histogram data from one region of interest of an acquired image into corrections to the gain and offset parameter values which are used in reacquiring the same image, but this time with an improved exposure. Such correction is to be obtained without significant interruption in the normal operating procedure of the image acquisition system, and must therefore not require the system to obtain calibration or other images during normal operation.

As stated above, a "score" must be developed for each histogram which is developed for an acquired image. The score function should quantify an image quality criterion which provides a numerical indication of the "goodness" or "badness" of an acquired image. In the context of the preferred embodiment of the present invention, the image quality criterion which is examined is the distribution of grayscale values in the region of interest of the acquired image. As stated above, a "good" gain and offset setting would provide a distribution spread across the entire grayscale range from grayscale zero to grayscale sixty-three.

With reference now to FIG. 12, it should be noted that there are no grayscale values in the region of interest from grayscale zero to grayscale five. Likewise, there are no grayscale values in the region of interest from grayscale forty-one through grayscale sixty-three. This indicates a poor grayscale distribution, and specifically indicates that upper and lower portions of the analog data stream have been clipped by incorrect offset and gain settings. In the preferred embodiment of the present invention, each histogram of the region of interest of the acquired image starts with a score function of one hundred, which is the maximum score value allowed. This score function is reduced by ten times the distance of the tails of the histogram from the outer edges of the grayscale. For example, with reference to FIG. 12, while the figure starts with an initial score of one hundred, this score is reduced by ten times the difference between grayscale forty and grayscale sixty-three, and is also reduced by ten times the difference between grayscale zero and grayscale six. Next, the score is further reduced by the RMS error (that is, root mean square error) between the actual pixel count at the tails of the histogram of the acquired image and the optimum count which is expected at ideal histogram tails. With reference again to FIG. 12, the lowermost histogram tail is at grayscale six, while the uppermost histogram tail is located at grayscale forty. As shown in FIG. 12, there are fifteen pixels in the region of interest which have a grayscale count of six, and two pixels in the region of interest which have a grayscale count of forty. These pixel counts vary from an optimal amount which is expected for an image which has a good distribution of grayscale values.

The largest subtraction from the ideal score value is attributable to the lack of counts for grayscale values at the upper and lower ends of the histogram, and is especially true since the ideal score is diminished by ten times these differences. Therefore, in evaluating an acquired image, special attention is paid to the tails of the histogram to determine whether the image distribution is "good". Of course, a variety of alternative techniques exist or may be developed to provide a numerical score for grayscale distribution of a region of interest of an acquired image.

In the preferred embodiment of the present invention, it was discovered that working with sixty-four different grayscale values made data handling cumbersome. Therefore, particular ones of the sixty-four grayscale values have been grouped together to define "data buckets" which facilitate the manipulation of the data provided in the histogram. With reference once again to FIG. 12, ten data buckets have been developed in the preferred embodiment of the present invention, including data buckets 160, 162, 164, 166, 168, 170, 172, 174, 176, and 178.

As shown in FIG. 12, data bucket 160 is defined by grayscale values zero, one, two and three. Data bucket 162 is defined by grayscale values four, five, six, and seven. Data bucket 164 is defined by grayscale values eight, nine, ten, and eleven. Data bucket 166 is defined by grayscale values twelve, thirteen, fourteen, and fifteen. Data bucket 168 is defined by grayscale values sixteen, seventeen, eighteen, nineteen, twenty, twenty-one, twenty-two, twenty-three, twenty-four, twenty-five, twenty-seven, twenty-eight, twenty-nine, thirty, and thirty one. Data bucket 170 is defined by grayscale values thirty-two, thirty-three, thirty-four, thirty-five, thirty-six, thirty-seven, thirty-eight, thirty-nine, forty, forty-one, forty-two, forty-three, forty-four, forty-five, forty-six, and forty-seven. Data bucket 172 is defined by grayscale values forty-eight, forty-nine, fifty, and fifty-one. Data bucket 174 is defined by grayscale values fifty-two, fifty-three, fifty-four, and fifty-five. Data bucket 176 is defined by grayscale values fifty-six, fifty-seven, fifty-eight, and fifty-nine. Data bucket 178 is defined by grayscale values sixty, sixty-one, sixty-two, and sixty-three. Each of the data buckets operates to accumulate all pixel counts for the grayscale values of its range. The selection of alternative analog-to-dititial digitization components could require the use of a larger or smaller number of data buckets.

Note that the grayscale values between grayscale zero and grayscale fifteen define four separate data buckets, that the grayscale values between grayscale sixteen and grayscale forty-seven define two separate data buckets, and that the grayscale values forty-eight through sixty-three define four separate data buckets. In the preferred embodiment, these data buckets define inputs to a neural network during a learning mode of operation (as well as during normal operation), so it is apparent the uppermost and lowermost portions of the grayscale will have a greater impact on the "learning" process than will the grayscale values in the intermediate portion of the grayscale. This is an intended result, since, as discussed above, the clipping of the data signal and corresponding loss of information will occur at the upper and lower portions of the analog data signal, and thus affect the uppermost and lowermost portions of the histogram. If, as shown in FIG. 12, there are no grayscale values for the uppermost and lowermost portions of the histogram, it is fair to assume that at least the gain value is inadequate for the total voltage span of a large percentage of the input signals in the region of interest. It is also possible that the offset value is incorrect, resulting in further loss of information.

Figure 14:
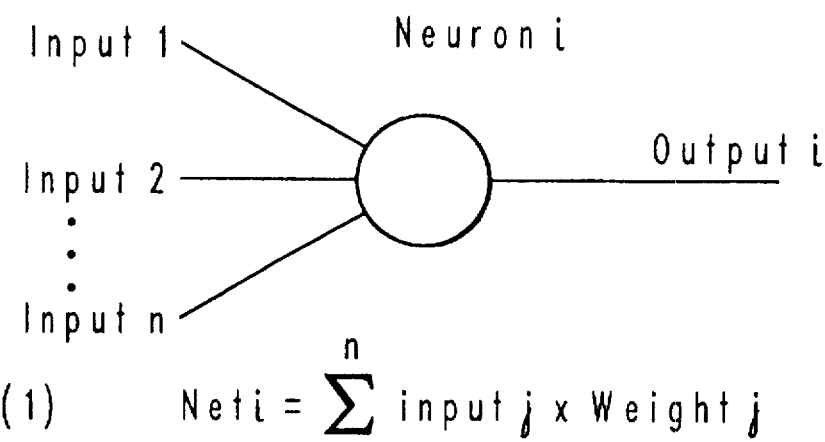
FIG. 14 depicts a model of neural network processing.

With reference now to FIG. 14, there is depicted a "perceptron" which is a basic operating unit of a neural network system. Neuron$_j$ is representative of all the perceptron units in a neural network. Each neuron will receive a number of inputs spanning from input $_1$ to input $_n$. Each neuron will provide an output of output $_j$, as is shown in FIG. 14. Formulas numbers 1 and 2 of FIG. 14 provide the mathematical relationship between inputs, weight values, and outputs. Net$_j$ is the sum of the product of the inputs and the weights attributable to each input over the range of all the inputs. The output is determined by an "activation function" which is provided as formula 2 in FIG. 14. In using these formulas, two operating assumptions exists, namely: (1) all inputs are scaled to values between zero and one; and (2) all outputs are between zero and one, by virtue of the activation function. It should be appreciated that scaling of the inputs and outputs is not required, but such scaling does operate to speed up the calculations performed by feed forward neural network 32.

Figure 15:
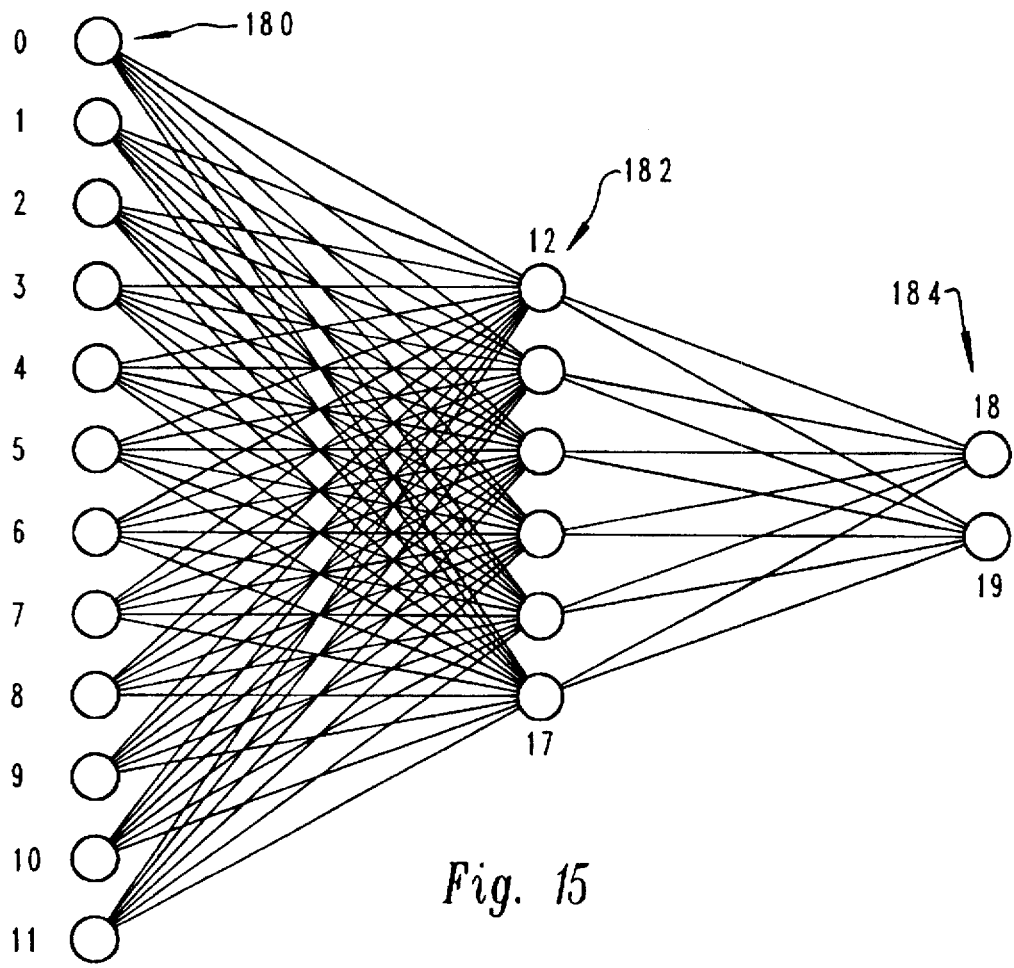
FIG. 15 graphically illustrates the neural network used in the preferred embodiment, the weights of which are obtained from the neural network training set.

With reference now to FIG. 15, there is depicted the preferred neural network model of the present invention. The model includes input nodes 180, intermediate nodes 182, and output nodes 184. There are twelve of input nodes 180. In FIG. 15, input nodes 180 are identified by numerals zero through eleven. Numerals zero through nine identify ten input nodes which receive data from the data buckets which are described above in connection with FIG. 12, as follows:

| INPUT NODE | | DATA BUCKET |
|---|---|---|
| 0 | receives data from | 160 |
| 1 | receives data from | 162 |
| 2 | receives data from | 164 |
| 3 | receives data from | 166 |
| 4 | receives data from | 168 |
| 5 | receives data from | 170 |
| 6 | receives data from | 172 |
| 7 | receives data from | 174 |
| 8 | receives data from | 176 |
| 9 | receives data from | 178 |

In FIG. 15, intermediate nodes 182 include nodes twelve, thirteen, fourteen, fifteen, sixteen, and seventeen. Every input node 180 is connected to every intermediate node 182. Intermediate nodes 182 represent "hidden" nodes, and are thus inaccessible as either inputs or outputs from a neural network model. Output nodes 184 include nodes eighteen and nineteen. Every intermediate mode 182 is corrected to these output nodes 184.

In the preferred embodiment of the present invention, the neural network model also receives as inputs the scaled (between zero and one) numeric value of the offset and gain values which were used to obtain the acquired image from which the region of interest histogram provides grayscale counts to input nodes zero through nine. Therefore, inputs zero through eleven simultaneously provide an indication of: (1) the quality of the region of interest of the acquired image in terms of grayscale distribution, weighted so that the upper and lower portions of the grayscale histogram carry greater weight than intermediate portions; (2) a scaled value which is representative of the gain which was used to obtain the acquired image; and (3) a scaled value which represents the offset which was used to obtain the acquired image. In the preferred embodiment of the present invention, output nodes eighteen and nineteen provide a scaled numeric indication of the changes to the gain and offset values, respectively, which should be employed in taking the next acquired image, in order to improve the "quality" of the acquired image by ensuring a good distribution of grayscale values for the region of interest. The preferred neural network model which is depicted in FIG. 15 is a simple feed forward neural network in which a plurality of inputs are received at input nodes, and one or more output nodes are provided which produce output values which depend upon the values of the inputs, the weighted values of the interconnections between all nodes in the neural network and the thresholds of each of the neural nodes. This type of relationship is numerically and graphically depicted in FIG. 14, which was discussed above.

The development of the preferred neural network of the present invention can be described first with reference to FIG. 1. As shown therein, processor 14 includes storage 24 which holds neural network application program 28, training data 30, and feed forward neural network 32 (which is graphically depicted in FIG. 15). The feed forward neural network 32 is developed by supplying training data 30 to neural network application program 28. In the preferred embodiment of the present invention, neural network application program 28 comprises a commercially-available computer program of the International Business Machine Corporation, which is identified as *Neural Network Utility/2*, and further identified by Program No. 5798-RYK. A training subroutine entitled *Back Propagation Network* is utilized to receive training data 30 and develop feed forward neural network 32.

The development of training data 30 will now be described with reference to FIGS. 13a and 13b, which provide a flowchart depiction of the process used to acquire the training data. The training data acquisition process begins at step 200. In step 202, the likely range of illumination variation is determined. This is an important step, since the upper and lower boundaries of the illumination range will also establish upper and lower operating boundaries for the neural network; in other words, the neural network model cannot function properly if it is not trained with data which spans over a likely range of illumination variation. In order to ensure that the likely range of variation in illumination is encompassed and represented by the training data, it is advisable that an illumination test range be established which extends beyond the likely illumination variation range which will be encountered during operation. As set forth in step 204, the process continues by relating the illumination test range to an illumination counter, with a zero counter value corresponding to either an upper or lower illumination maximum, and with an illumination counter value of "end" corresponding to the opposite upper or lower illumination maximum or minimum.

The training data acquisition process continues in step 206, wherein the offset and gain test ranges are established. Once again, it is advisable that offset and gain test range values be established which exceed the range of likely offset and gain values which are to be encountered in operation, in order to ensure that the neural network model is capable of handling all normal operating conditions. As depicted in step 208, the training data acquisition process continues by relating the offset and gain test ranges to an offset counter and a gain counter. As with the illumination counter, the zero values for the offset and gain counters represent either minimum or maximum offset and gain values, while the "end" values for the offset and gain counters represents the opposite extreme. It is possible to establish a single offset and gain counter which is correlated to a plurality of offset and gain values which vary over the test ranges for the offset and gain parameters.

As set forth in software step 210, the data acquisition process continues by setting illumination, offset, and gain values to correspond to the current illumination counter value, and the current offset and gain counter values. The process continues in block 212, wherein analog data is read from the region of interest. In step 214, the analog data is digitized over the grayscale range. Then, in step 216, a histogram is developed of the grayscale values. In step 218, the histogram which was developed in step 216 is scored to provide a quantative indication of grayscale value distribution. As discussed above, the scoring may include one or more scoring techniques which emphasize or deemphasis certain portions of the histogram. In step 220, the offset and gain counters are incremented.

Figure 16:
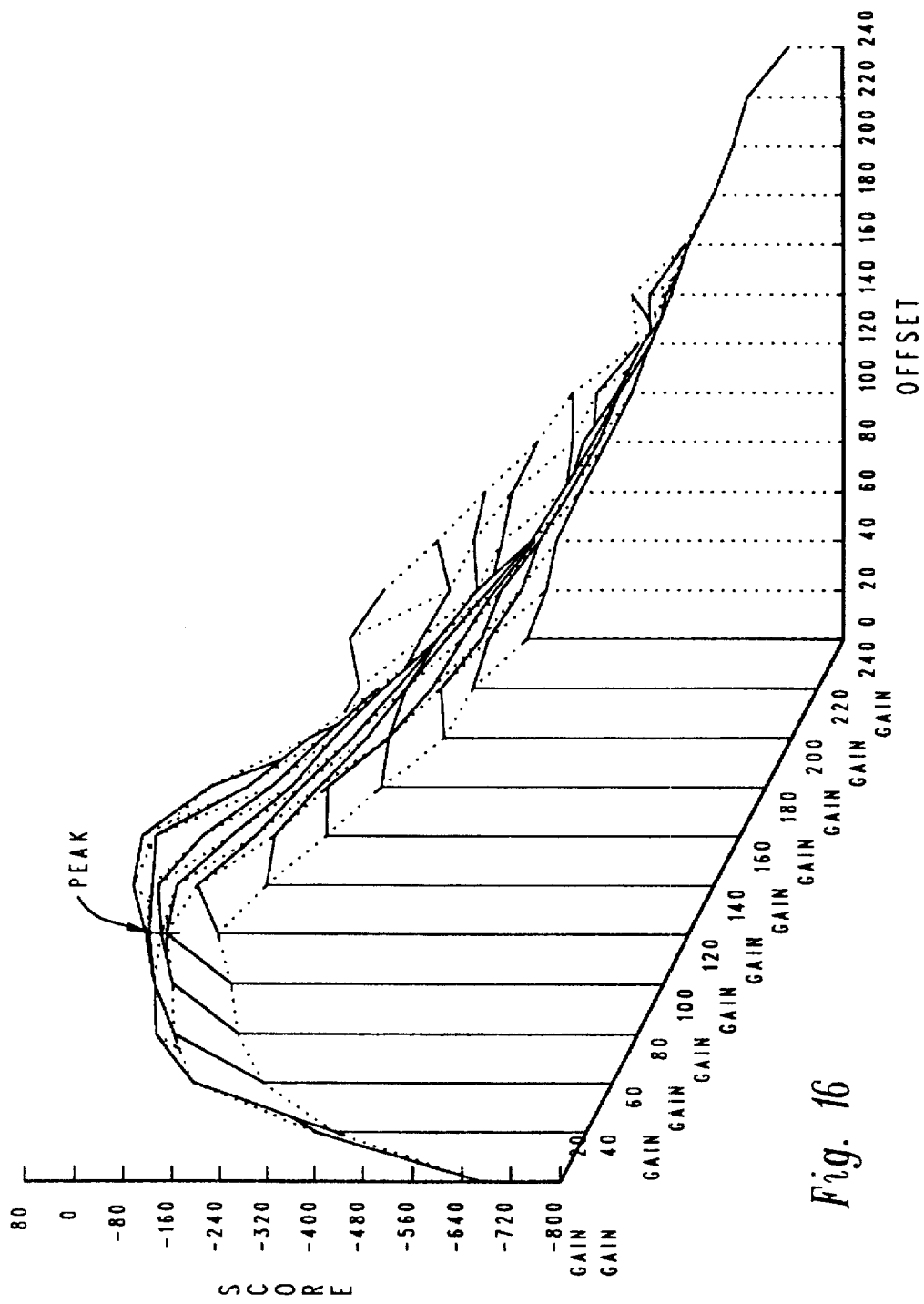
FIG. 16 depicts the model which is obtained in the process of creating a neural network training set.

Decision block 222 represents a determination of whether or not the offset and gain counters are equal to a value of "END+1": if it is determined in decision block 222 that the offset and gain counters are not equal to "END+1", the process continues at step 210; however, if it is determined in decision block 222 that the offset and gain counters are equal to "END+1", the process continues in step 224. Decision block 222 essentially provides a loop, wherein software operations representative by blocks 210, 212, 214, 216, 218, and 220 are repeated until the counter or counters which are established for offset and gain are incremented from zero to an end value. If the offset and gain counters have been cycled from zero of the end value, the process will be repeated at a different illumination level until the illumination counter is cycled from its lowest value to its highest value. FIG. 16 provides a graphic depiction of the scored histogram data which may be collected during this loop operation. As shown, in this figure, the X-axis is representative of offset, the Y-axis is representative of gain, and the Z-axis is representative of score values. For the constant illumination level of this iterative process, a three-dimensional map is developed. The highest score over the entire ranges of offset and gain is identified as the "peak" value. This value is recognized as the best setting for gain and offset for the illumination level for the data represented in FIG. 16, the optimum values are gain=100 and offset=20. These values are recorded in memory, and are used to establish correction factors during the supervised training phase of developing the neural network.

Returning now to FIGS. 13a and 13b, in step 224, the illumination counter is incremented, and in decision block 226 it is determined whether or not the value of the illumination counter is equal to "END+1": if the value of the illumination counter is equal to END+1, the process continues at block 232 by ending; however, if it is determined in decision block 226 that the illumination counter is not equal to "END+1", the process continues at step 228 by incrementing the illumination counter. In step 230, the process is returned to step 210. Essentially, blocks 226, 228, and 230 operate to provide a software loop which is performed until the illumination counter is equal to the value of "END+1".

Figure 13A:
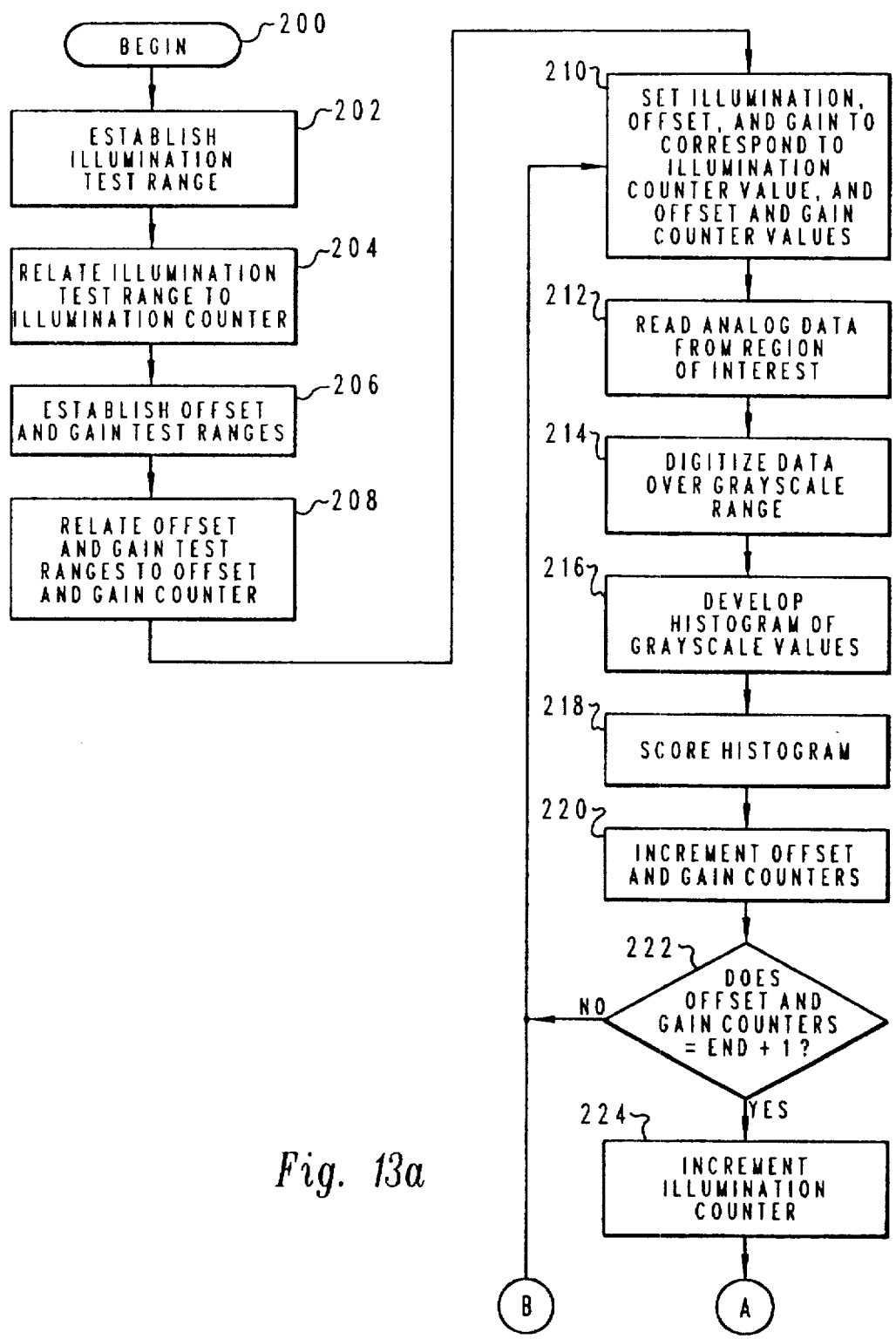
FIGS. 13A and 13B illustrate, in flowchart form, the process used to create a neural network training set.
Figure 13B:
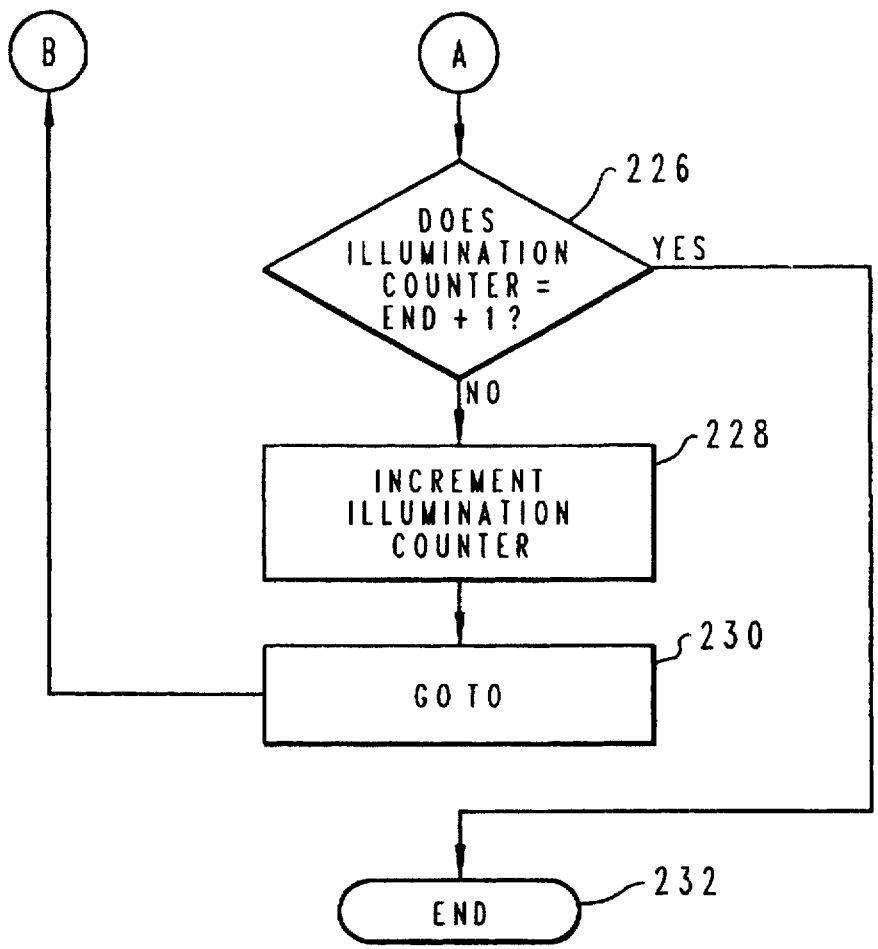

Put in other words, the training data acquisition process which is represented in high level flowchart form in FIGS. 13a and 13b requires that a series of images be acquired at various gain and offset settings, and that they be transformed into histograms, and that numeric distribution "score" values be determined for each histogram. This image acquisition process, histogram development, and scoring is repeated over an entire range of gain and offset setting values at a selected and fixed illumination level and gain and offset values be determined for the "peak" score. Once all gain and offset combinations have been used, the process is repeated at a different illumination level. A large number of illumination levels are employed to develop a large number of scored values for acquired images over a variety of illumination values, offset values, and gain values.

This empirically obtained training data is then supplied to a back-propagation neural network, such as those provided in one or more commercially available back propagation neural network utility application programs. The application software receives and inputs the training data, and produces as outputs the corrections necessary to the gain and offset parameters which are needed to optimize the grayscale distribution of the subsequent image. The training data is then cycled through a network developed in the application software during a learning phase of operation, the weights of links between neural nodes to be adjusted to minimize the error between its predicted outputs and the outputs contained in the training data. When the network has been "taught" within acceptable error limits, the weights are locked and recorded.

In the preferred embodiment of the present invention, a simple feed-forward neural network, such as is graphically depicted in FIG. 15, is coded with the recorded weights to ensure that particular input values which represent (1) histogram data from the region of interest of the current acquired image, (2) the current offset value, and (3) the current gain value will develop at output nodes 18 and 19 correction factors which are applied to the current offset and gain values to ensure optimal grayscale value distribution in the next acquired image.

Figure 17:
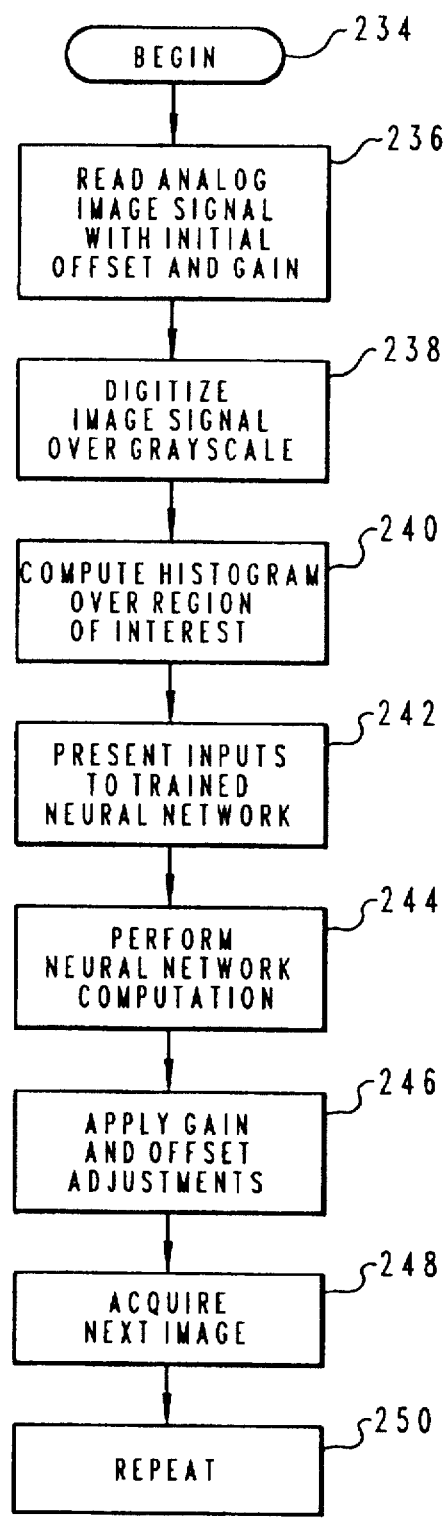
FIG. 17 depicts, in flowchart form, the process of providing corrected gain and offset values to the input section which is depicted in FIGS. 3 and 4 of the commercially available vision system of FIG. 2.

FIG. 17 depicts, in high level flowchart form, the process of automatically and continually correcting offset and gain values for successive acquired images based upon a neural network evaluation of a histogram of the region of interest of the present acquired image. The process begins at step 234, wherein camera 62 of FIG. 2 obtains video images of objects 38. In step 236, the analog image signal is read, with initial offset and gain values provided to input section 66 of FIG. 2. In step 238, the analog image signal of the region of interest is digitized over a grayscale to provide a grayscale indication of the lightness and darkness of the plurality of pixels which comprise the region of interest. In step 240, a histogram of the digital pixel data stream is obtained. As discussed above, the histogram provides a plot of pixel count versus grayscale value to show a distribution of grayscale values, and provide an indication of grayscale value distribution. In step 242, the inputs of data buckets 160, 162, 164, 166, 168, 170, 172, 174, 176, and 178, as well as scaled indications of the current values of the offset and gain are provided as inputs to the neural network which is depicted in schematic form in FIG. 15.

The neural network performs computations, according to step 244, and provides as an output correction factors which should be applied to the current offset and gain values in order to obtain an improved grayscale value distribution in the next acquired image. In step 246, the gain and offset adjustments are applied to input section 66 of FIG. 2. In step 248, the next image is acquired, but this time with the modified gain and offset values, thus resulting in an improved grayscale value distribution, and improved image quality. According to step 250, the process is repeated. Each acquired image provides a foundation for correction factors which may be applied in acquiring the subsequent image. The process is forever self-correcting, but will converge extremely rapidly to an optimal offset and gain setting. Experience has revealed that one or two iterations will lock the system into optimal performance.

While the invention has been particularly shown and described with reference to a preferred embodiment, it will be understood by those skilled in the art that various changes in form and detail may be made therein without departing from the spirit and scope of the invention.

We claim:

1. In an image acquisition device which produces at least one acquired image, each of which is characterizeable with reference to at least one image quality criterion which is at least in-part established by an exposure parameter value, an apparatus for optimizing said image quality criterion, comprising:

an image acquisition means for obtaining at least one image under selected exposure characteristics as determined by at least one exposure parameter value;

a neural network means for (a) maintaining a learned relationship between said at least one image quality criterion and said at least one exposure parameter value which is developed from training data during a training data acquisition mode of operation from image acquisition over a range of values for said exposure parameter values, and (b) receiving said at least one image quality criterion of said at least one image from said image acquisition means and providing a correction for said at least one exposure parameter value without modification of said learned relationship; and a feed forward controller member for supplying said correction for said at least one exposure parameter value to said image acquisition means for use in digitizing at least one subsequent image to compensate for changes in illumination of areas that are viewed repetitively.

2. An apparatus for optimizing said at least one image quality criterion according to claim 1, wherein said image acquisition means comprises at least one video camera.

3. An apparatus for optimizing said at least one image quality criterion according to claim 1, wherein said image acquisition means comprises at least one video camera, and wherein said neural network means maintains a learned relationship between said at least one image quality criterion and at least one video camera input variable which affects receipt of video images by said at least one video camera.

4. An apparatus for optimizing said at least one image quality criterion according to claim 1, wherein said image acquisition means comprises at least one video camera and wherein said neural network means maintains a learned relationship between said at least one image quality criterion and a plurality of video camera input variables, including at least one control parameter which affects digitization of analog video signals from said at least one video camera.

5. An apparatus for optimizing said at least one image quality criterion according to claim 4, wherein said at least one control parameter includes an offset parameter which defines digital video image zero.

6. An apparatus for optimizing said at least one image quality criterion according to claim 4, wherein said at least one control parameter includes a gain parameter which defines a maximum analog signal voltage span which is accepted for digitization without loss of information contained therein.

7. An apparatus for optimizing said at least one image quality criterion according to claim 1, further comprising:

transform means for developing an energy distribution mapping of at least a portion of said at least one image which provides said at least one image quality criterion by relating image quality of said portion of said at least one image to said image quality criterion.

8. An apparatus for optimizing said at least one image quality criterion according to claim 7, wherein said transform means develops at least one grayscale histogram of said at least one image.

9. In an image acquisition device which produces at least one acquired image, each of which is characterizeable with reference to at least one image quality criterion which is at least in-part established by an exposure parameter value, an apparatus for optimizing said image quality criterion, comprising:

an image acquisition means for obtaining a single image under selected exposure characteristics as determined by at least one exposure parameter value;

a neural network exposure parameter correction model which maintains an established relationship between said at least one image quality criterion and said at least one exposure parameter value which is developed from training data during a training data acquisition mode of operation from image acquisition over a range of values for said at least one exposure parameter value, for receiving said at least one image quality criterion of said single image from said image acquisition means and providing a correction for said at least one exposure parameter value during an image acquisition mode of operation without modification of said established relationships; and a feed forward controller member for supplying said correction for said at least one exposure parameter value to said image acquisition means for use in digitizing at least one subsequent image to compensate for changes in illumination of areas that are viewed repetitively.

10. An apparatus for optimizing said at least one image quality criterion according to claim 9, wherein said single image comprises one region of interest of a selected image, and wherein said at least one subsequent image comprises other regions of interest of said selected image.

11. An apparatus for optimizing said at least one image quality criterion according to claim 9, wherein said neural network exposure parameter correction model comprises a software model which relates image quality as determined by grayscale value distribution of a single image to correction values for at least one exposure parameter value.

12. An apparatus for optimizing said at least one image quality criterion according to claim 11, wherein said software model comprises a feed forward neural network.

13. An apparatus for optimizing said at least one image quality criterion according to claim 12, wherein neural nodes in said feed forward neural network are connected by linkages which are weighted according to weight values developed during a training mode of operation.

14. A method of obtaining improved quality images in an image acquisition system, comprising the method steps of:

developing, during a training data acquisition mode of operation, training data from image acquisition over a range of image exposure parameter values;

developing a neural network software model from said training data of a relationship between said image quality criteria and said image exposure parameter values;

acquiring, during normal operations, a single image, with known image exposure parameter values;

determining an image quality criterion from said single image;

supplying said image quality criterion and said known image exposure parameter value as inputs to said neural network software model of said relationship between said image quality criterion and said image exposure parameter values;

developing, with said neural network software model, improved image exposure parameter values as an output; and supplying said improved image exposure parameter values to said image acquisition system to compensate for changes in illumination of areas that are viewed repetitively when subsequent images are digitized.

15. In an image acquisition device for use with a magnetic tape library which produces at least one acquired image of machine readable labels affixed to magnetic tape cartridges in said magnetic tape library, each of which is characterizeable with reference to at least one image quality criterion which is at least in-part established by an exposure parameter value, an apparatus for optimizing said image quality criterion, comprising:

an image acquisition means for obtaining at least one image of selected ones of said machine readable labels under selected exposure characteristics as determined by at least one exposure parameter value;

a neural network means for (a) maintaining a learned relationship between said at least one image quality criterion and said at least one exposure parameter value which is developed from training data during a training data acquisition mode of operation from image acquisition over a range of values for said at least one exposure parameter values, and (b) receiving said at least one image quality criterion of said at least one image from said image acquisition means and providing a correction for said at least one exposure parameter value during an image acquisition mode of operation without modification of said learned relationship; and a feed forward controller member for supplying said correction for said at least one exposure parameter value to said image acquisition means for use in digitizing at least one subsequent image of said selected ones of said machine readable labels to compensate for changes in illumination of areas that are viewed repetitively.

16. A method of obtaining improved quality images of machine readable labels affixed to magnetic tape cartridges in a magnetic tape library with an image acquisition system, comprising the method steps of:

developing, during a training data acquisition mode of operation, training data from image acquisition over a range of image exposure parameter values;

developing a neural network software model from said training data of a relationship between said image quality criteria and said image exposure parameter values;

acquiring, during normal operations, a single image of at least one machine readable label, with known image exposure parameter values;

determining an image quality criterion from said single image;

supplying said image quality criterion and said known image exposure parameter value as inputs to said neural network software model of said relationship between said image quality criterion and said image exposure parameter values;

developing, with said neural network software model, improved image exposure parameter values as an output; and supplying said improved image exposure parameter values to said image acquisition system to compensate for changes in illumination of areas that are viewed repetitively when subsequent images of at least one machine-readable label are digitized.

17. A method of obtaining improved quality images of target objects in an image acquisition system, comprising the method steps of:

illuminating said target objects with an illumination source which fluctuates in intensity;

developing, during a training data acquisition mode of operation, training data from image acquisition over a predefined range of illumination intensities and corresponding image exposure parameter values;

developing a neural network software model from said training data of a relationship between said image quality criteria and said image exposure parameter values;

acquiring, during normal operations, a single image, with known image exposure parameter values;

determining an image quality criterion from said single image;

supplying said image quality criterion and said known image exposure parameter value as inputs to said neural network software model of said relationship between said image quality criterion and said image exposure parameter values;

developing, with said neural network software model, improved image exposure parameter values as an output; and supplying said improved image exposure parameter values to said image acquisition system to compensate for changes in illumination of areas that are viewed repetitively when subsequent images are digitized.

18. An improved vision system for use with a magnetic tape library which produces at least one acquired image of machine readable labels affixed to magnetic tape cartridges in said magnetic tape library, each of which is characterizeable with reference to at least one image quality criterion which is at least in-part established by an exposure parameter value, comprising:

an illumination source providing illumination on said machine readable labels affixed to said magnetic tape cartridges which fluctuates in intensity;

an image acquisition means for obtaining at least one image of selected ones of said machine readable labels under selected illumination intensities and corresponding exposure characteristics as determined by at least one exposure parameter value;

a neural network means for (a) maintaining a learned relationship between said at least one image quality criterion and said at least one exposure parameter value which is developed from training data during a training data acquisition mode of operation from image acquisition over a range of values for said at least one exposure parameter values, and (b) receiving said at least one image quality criterion of said at least one image from said image acquisition means and providing a correction for said at least one exposure parameter value during an image acquisition mode of operation without modification of said learned relationship; and a feed forward controller member for supplying said correction for said at least one exposure parameter value to said image acquisition means for use in digitizing at least one subsequent image of said selected ones of said machine readable labels to compensate for changes in illumination of areas that are viewed repetitively when subsequent images are digitized.

19. A method of obtaining improved quality images of machine readable labels affixed to magnetic tape cartridges in a magnetic tape library with an image acquisition system, comprising the method steps of:

developing, during a training data acquisition mode of operation, training data from image acquisition over a range of illumination intensities and corresponding image exposure parameter values;

developing a neural network software model from said training data of a relationship between said image quality criteria and said image exposure parameter values;

acquiring, during normal operations, a single image of at least one machine readable label, at a particular illumination intensity with known image exposure parameter values;

determining an image quality criterion from said single image;

supplying said image quality criterion and said known image exposure parameter value as inputs to said neural network software model of said relationship between said image quality criterion and said image exposure parameter values;

developing, with said neural network software model, improved image exposure parameter values as an output; and supplying said improved image exposure parameter values to said image acquisition system to compensate for changes in illumination of areas that are viewed repetitively when subsequent images of at least one machine-readable label are digitized.

* * * * *